United States Patent
Hilton et al.

(10) Patent No.: US 6,871,789 B2
(45) Date of Patent: *Mar. 29, 2005

(54) DOCUMENT PRINTED WITH GRAPHICAL SYMBOLS WHICH ENCODE INFORMATION

(75) Inventors: David Hilton, Glos (GB); Weichao Tan, Oxford (GB); Peter Wells, Wokingham (GB)

(73) Assignee: Enseal Systems Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/467,428
(22) PCT Filed: Feb. 8, 2002
(86) PCT No.: PCT/GB02/00544

§ 371 (c)(1),
(2), (4) Date: Aug. 5, 2003

(87) PCT Pub. No.: WO02/065383

PCT Pub. Date: Aug. 22, 2002

(65) Prior Publication Data

US 2004/0060990 A1  Apr. 1, 2004

(30) Foreign Application Priority Data

| Feb. 9, 2001 | (GB) | ............................................. | 0103153 |
| Feb. 9, 2001 | (GB) | ............................................. | 0103155 |
| Mar. 2, 2001 | (GB) | ............................................. | 0105241 |
| Apr. 26, 2001 | (GB) | ............................................. | 0110247 |
| Aug. 15, 2001 | (GB) | ............................................. | 0119908 |

(51) Int. Cl.[7] ........................ G06K 19/06; G06K 19/00
(52) U.S. Cl. ..................................... 235/494; 235/487
(58) Field of Search ................................. 235/487, 494; 283/17, 72, 73, 3.28

(56) References Cited

U.S. PATENT DOCUMENTS

| 5,091,966 | A | | 2/1992 | Bloomberg et al. | |
| 5,245,165 | A | | 9/1993 | Zhang | |
| 6,170,744 | B1 | | 1/2001 | Lee et al. | |
| 6,254,007 | B1 | * | 7/2001 | Mowry, Jr. | ................. 235/494 |
| 6,457,651 | B2 | * | 10/2002 | Paul et al. | ................... 235/494 |
| 6,549,624 | B1 | * | 4/2003 | Sandru | ........................ 380/51 |
| 6,748,102 | B2 | * | 6/2004 | Prakash | ...................... 382/137 |
| 2003/0141375 | A1 | * | 7/2003 | Lawandy | .................... 235/494 |

* cited by examiner

Primary Examiner—Thien M. Le
Assistant Examiner—April Taylor
(74) Attorney, Agent, or Firm—Synnestvedt Lechner & Woodbridge, LLP; Thomas J. Onka, Esq.

(57) ABSTRACT

A document is printed with graphical symbols which encode information but are not human readable; the graphical symbols are formed into some or all of visible element printed on the document. The outline of this element is used for synchronising an automated process for scanning the document to extract the encoded information from the element. In prior art systems, synchronising an automated process for scanning the document to extract the encoded information from the element requires large scale arrangement of the graphical symbols (e.g. a horizontal line of glyphs which are all forward facing and which intersect a vertical line of glyphs which are all rearward facing). This considerably mars the appearance of a printed document. This negative impact on appearance has been one of the major causes inhibiting the uptake of graphical symbol technology for encoding information.

30 Claims, 9 Drawing Sheets

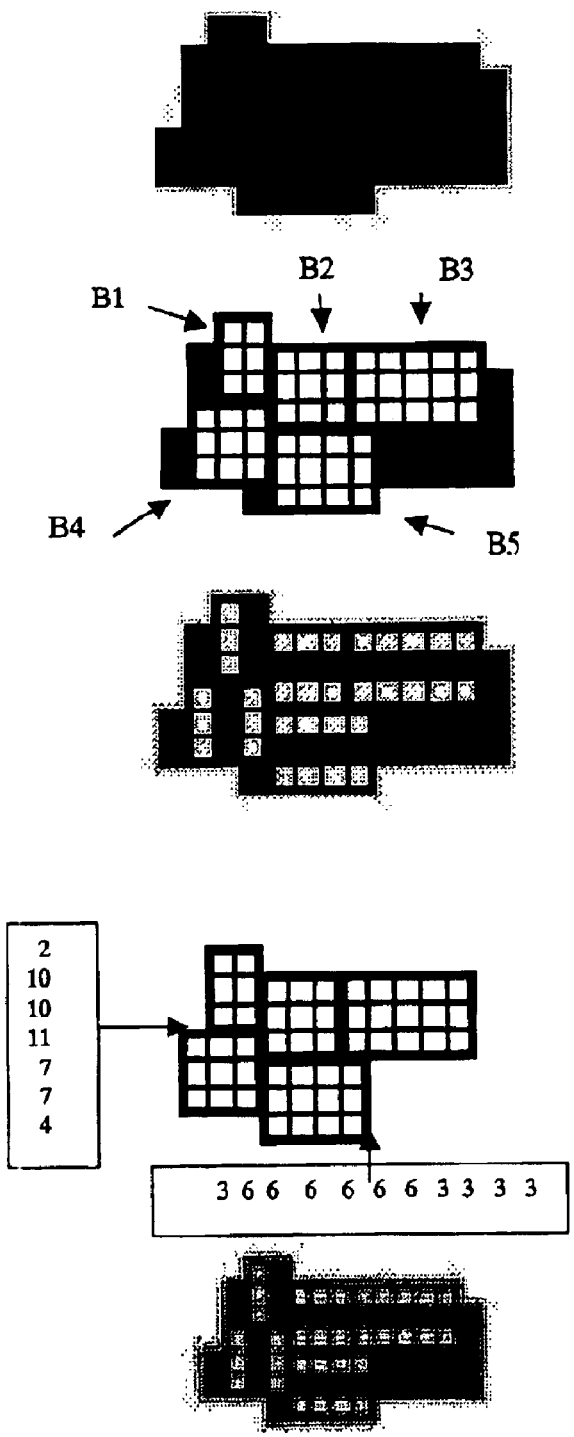

(a) Original Template (b) Template Subdivided into Cells
All of height 3, minimum width 2, max width 5.
Black areas too small to fit a cell (c) Cells filled with Bitmorphs representing code 10010.
'1' => vertical line
'0' => horizontal line
This is the form for printing (d) Form of template sent to decoder together with array of line widths and heights to enable synchronisation to take place.
The uncoded edge sections are not supplied explicitly to the decoder software.

(e) Scanned Image.
Rotate and rescale to match the numbers in the rows and columns given in (d)

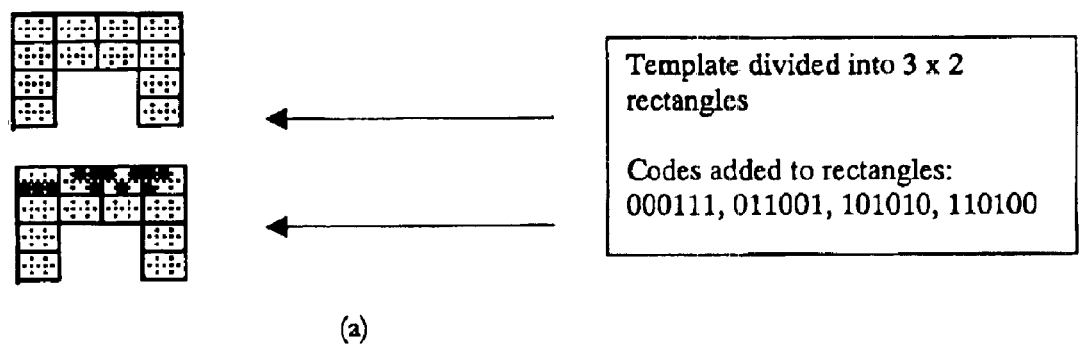
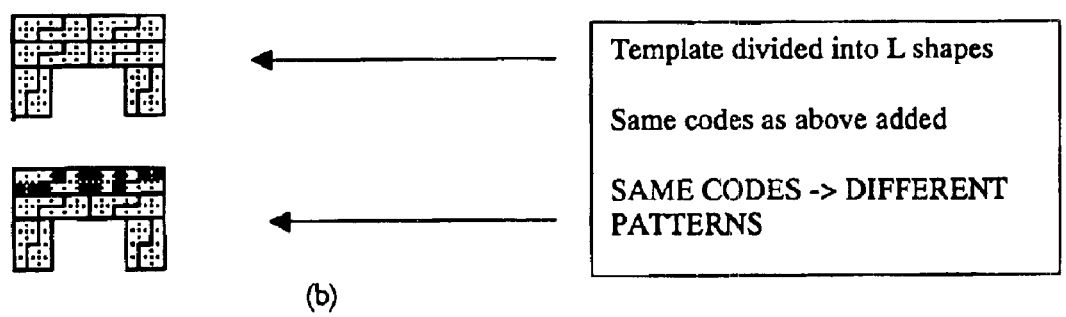
Figure 5A

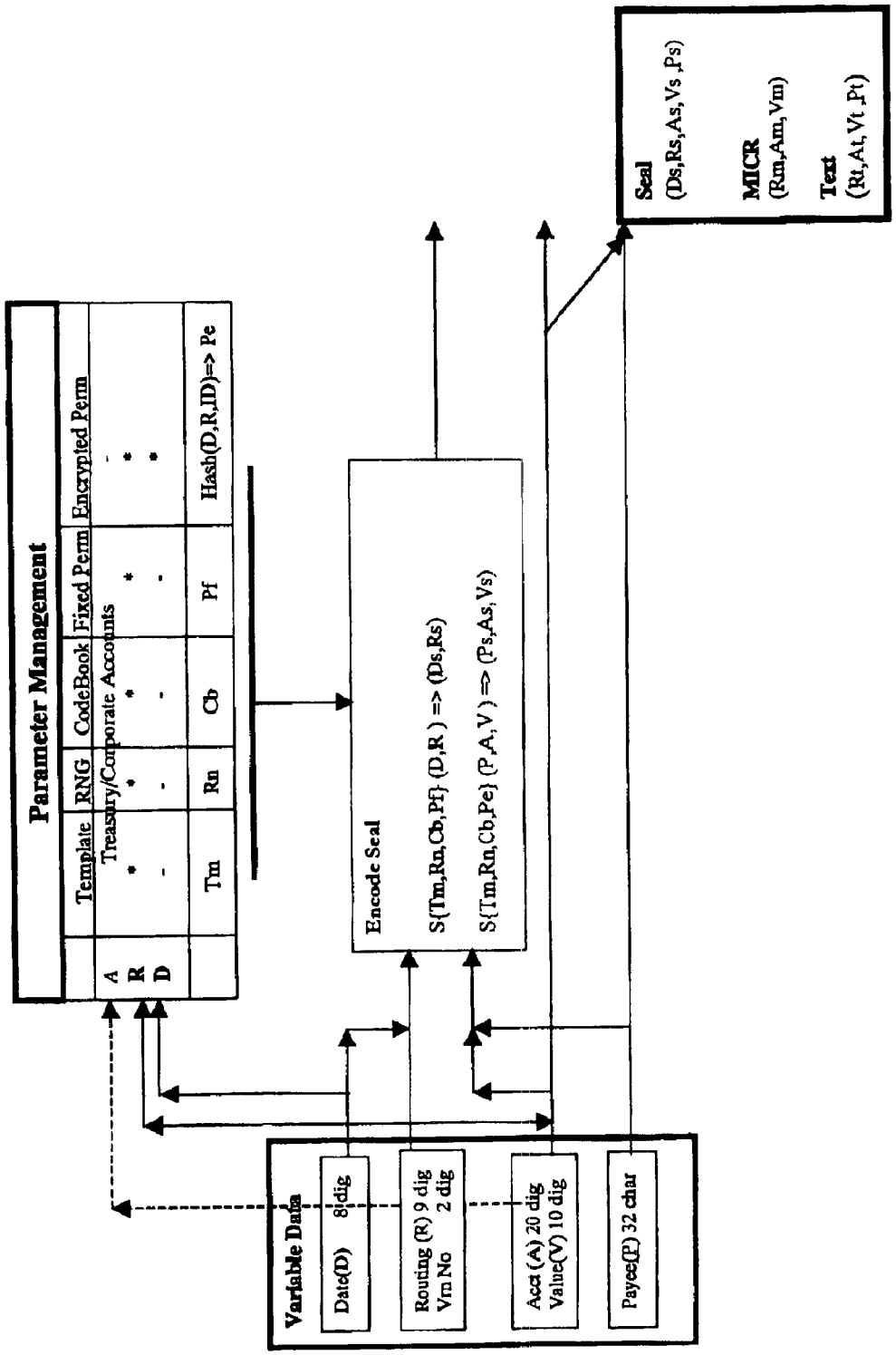

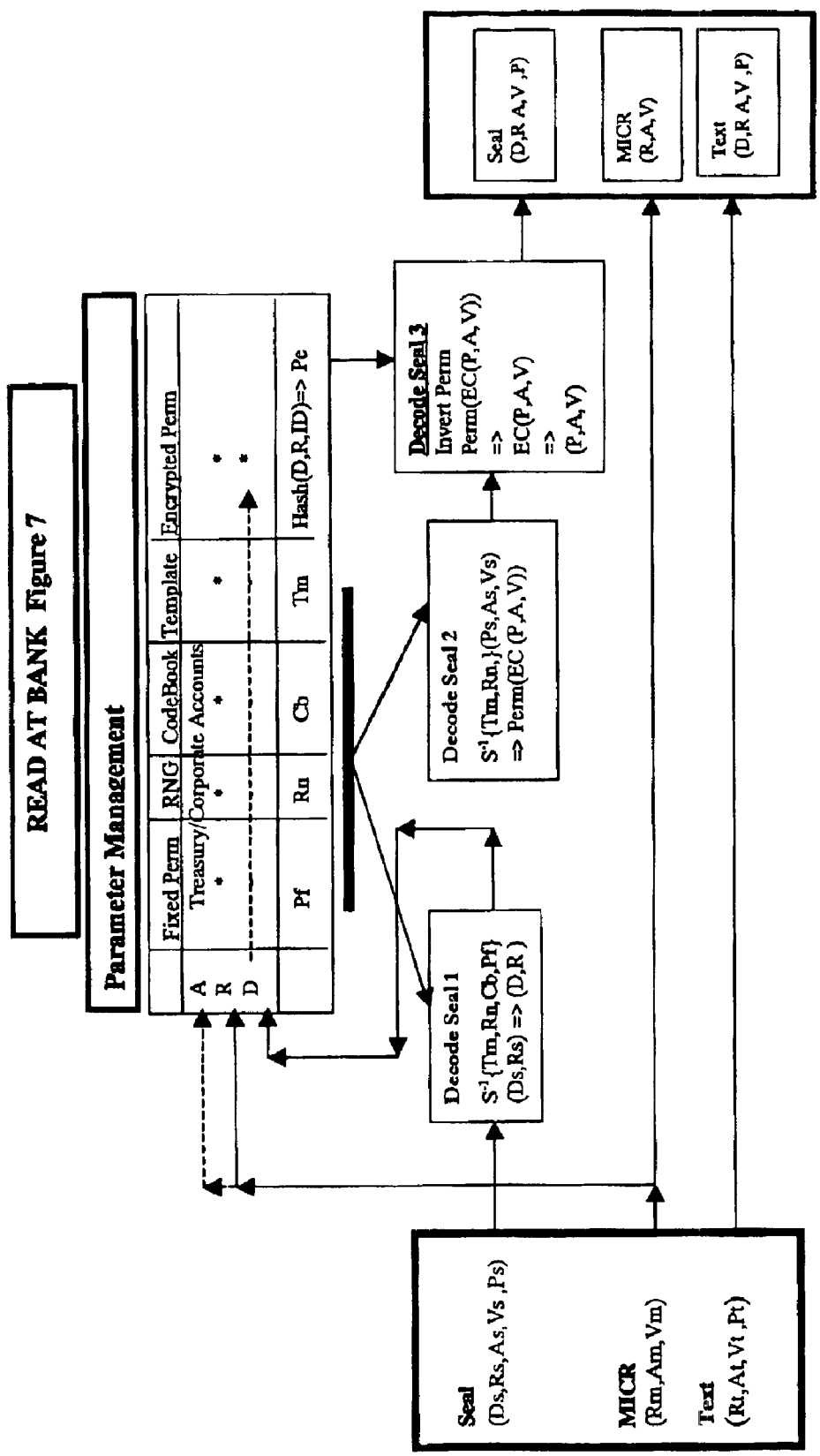

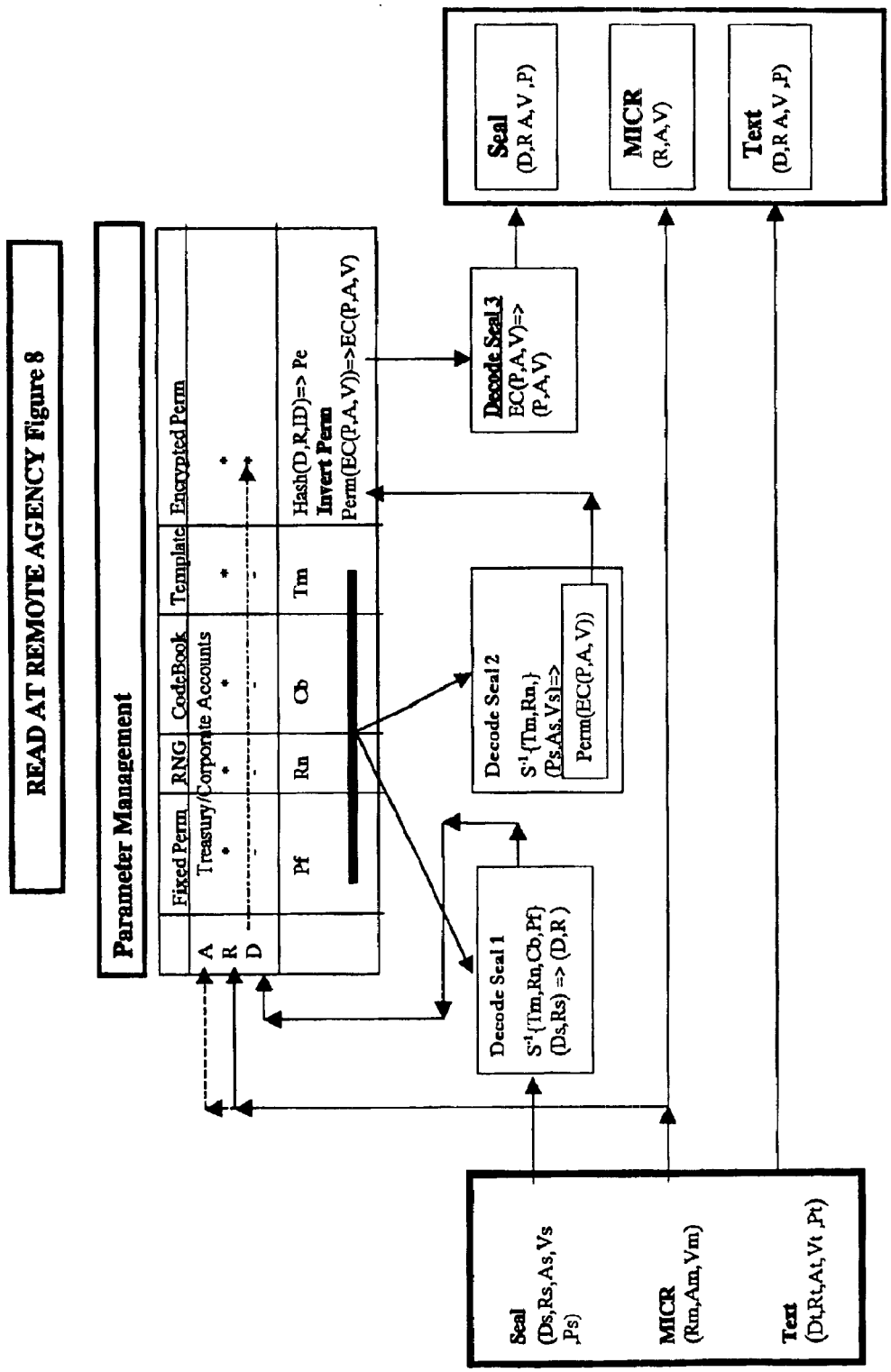

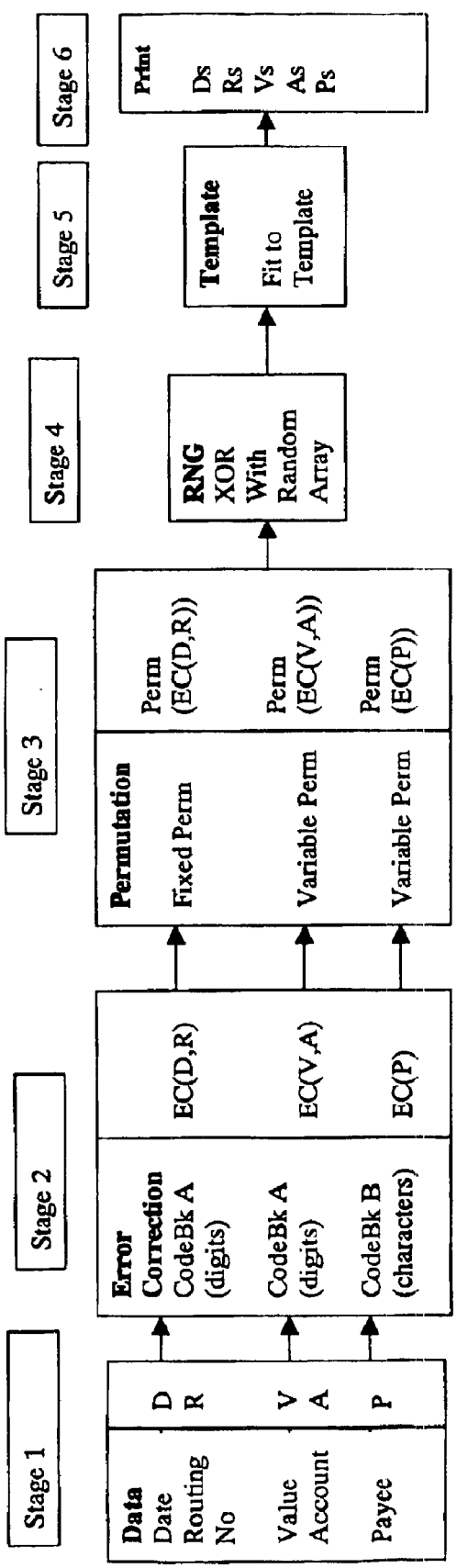

DOCUMENT PRINTED WITH GRAPHICAL SYMBOLS WHICH ENCODE INFORMATION

CROSS REFERENCE TO RELATED APPLICATIONS

This application claims the priority of PCT Application No. PCT/GB02/00544 filed on Feb. 8, 2002, and British applications GB 0103153.3 filed on 9 Feb. 2001, GB 0103155.8 filed on 9 Feb. 2001, GB 0105241.4 filed on 2 Mar. 2001, GB 0110247.4 filed on 26 Apr. 2001, and GB 0119908.2 filed on 15 Aug. 2001, the contents of which are hereby incorporated by reference.

BACKGROUND TO THE INVENTION

1. Field of the Invention

This invention relates to a document printed with graphical symbols which encode information. The encoded information is not human readable, but is visible, in the same way that a bar code is visible but not human readable. The term 'graphical symbol' means any visible mark which encodes information; it therefore includes glyphs, 2D bar codes and other forms of graphical indicia.

2. Description of the Prior Art

There are many security documents which are communicated between various agencies where the integrity of the documents is a major issue. A prime example is the use of cheques for financial transactions, billions of which are passed between clients and banks and where the risk of fraud is an ever present threat Security documents have historically been protected by a considerable range of devices. The actual materials from which they are made are difficult for an outsider to obtain or reproduce. There are devices such as holograms or metallic stripes which are intended to provide visual confirmation of integrity. There are machine readable magnetic stripes and, more recently, chips, that can contain information which guarantees authenticity. There is a range of special ink types, some, for instance, with special reflective properties which confuse scanners and make duplication difficult for counterfeiters.

Security documents can be divided into (a) those, such as currency, where the production of counterfeits is the main issue and where security against simple methods of reproduction is required, and (b) those such as cheques where the information contained in the document is the prime consideration. This latter group is the subject of this invention.

There is a need to handle many of these documents automatically using high speed printers and sorters. For this purpose the use of machine readable symbols is crucial. In these circumstances a solution that does not require special materials, or interruption to the workflow, is the requirement.

One system of machine readability from printed documents is the OCR (Optical Character Recognition) system, and this can achieve a high degree of accuracy from standard fonts but tends to fall well short of practical thresholds for handwritten script. A well established alternative solution is the printing of machine readable indicia or other kinds of graphical symbols with fixed formats using the standard printing process.

One method for adding data to printed documents is the use of graphical symbols called 'glyphs' (see U.S. Pat. Nos. 5,091,966 and 5,245,165). Glyphs are characters made up from four or five pixels of printed data which give a uniform greyish appearance and would typically be spread in a rectangle across the top of some secure document. This data can be read by scanning and running through an appropriate software program. Glyphs do not vary significantly in appearance across a printed document. They are typically small forward and backward slashes. Glyphs are also always located against a fixed, rectilinear grid. Standardising the shape of glyphs and placing them along a predefined rectilinear grid has been thought necessary for rapid and accurate machine scanning and recognition.

A further method for adding data is the use of 2D bar codes, particularly those in the PDF417 format. These bar codes use a fixed set of symbols and are very robust under such transformations as compression and photocopying.

2D bar codes and glyphs can provide authentication by two main methods. One method is to link the data in the machine embedded form with data that is contained in some other form in the document This other form could be ordinary readable script, or it could be in stylised form as in the MICR (magnetic ink character recognition) line on a cheque. A method is described in Payformance Corporation patent, U.S. Pat. No. 6,170,744 where a one way hash of visually readable information is embedded in a 2D Bar Code. An alternative form of authentication is provided if the embedded data is compared with information held in a database which is indexed by data on the document One important characteristic of encoding with graphical symbols is that the presence of the carrier of information is wholly overt or clearly apparent. Hence, the glyphs and 2D bar codes are clearly visible, although the information which is encoded in them would need decoding. The visibility of the information carrier is in marked contrast to stegonographic watermarking systems, in which the information carrier is specifically designed not to be readily perceptible; the primary objective of such watermarking schemes is to conceal both the information carrier as well as the information itself. The present invention does not relate to steganographic watermarking systems at all, but instead to systems in which the information carrier is readily perceptible.

As a practical matter, it should be noted that the use of a steganographic watermark to embed information with low visual impact in security documents is not a realistic option. This is because steganographic watermarks typically have a much lower information rate and are difficult to construct in suitable fashion using only the typical laser printer that is available at the time information is embedded into a security document such as a cheque.

There is one major disadvantage with current systems where the information carrier is a pattern of clearly visible graphical symbols feature (i.e. glyphs and 2D bar codes). It is that the feature may spoil the appearance of the document. For many situations, particularly cheques, anything which significantly detracts from the overall appearance of the document is commercially very unattractive. But, prior to the present invention, there has been no alternative to unsightly, conventional glyphs and 2D bar codes.

SUMMARY OF THE INVENTION

In a first aspect of the invention, there is a document printed with graphical symbols which encode information but are not human readable, and which are formed into some or all of a visible element printed on the document, wherein the outline of the element is used for synchronising an automated process for scanning the document to extract the encoded information from the element.

In prior art systems, synchronising an automated process for scanning the document to extract the encoded information from the element requires large scale arrangement of the graphical symbols (e.g. a horizontal line of glyphs which are all forward facing and which intersect a vertical line of glyphs which are all rearward facing). This considerably mars the appearance of a printed document. This negative impact on appearance has been one of the major causes inhibiting the uptake of graphical symbol technology for encoding information. Highly regular and therefore visible arrangements of graphical symbols are not needed in the present invention since synchronisation relies on recognition of the element outline.

Further aspects and details of the invention are contained in the Claims of this specification.

The presence of the graphical symbols is largely disguised because they form the internal structure of an element, which itself blends into the overall appearance of the document, unlike prior art glyphs or 2D bar codes, which stand out. Within the element itself, fine structure—(i.e. the individual graphical symbols) is present (although it may be difficult to see clearly); this fine structure carries the information payload.

The invention can be thought of as distributing visually apparent fine structure in an aesthetic manner. Because there is no need to make the fine structure totally imperceptible (unlike steganographic watermarking systems), this structure can carry a far higher information payload in a robust manner; this is a critical advantage where the documents need to be printed at high speed using conventional printers (e.g. high speed laser printers) and also scanned at high speed with relatively unsophisticated equipment, as might be found at a retail store or ordinary retail bank branch.

Hence, the invention combines the advantages of a robust information payload (available in conventional 2D bar codes and glyphs, but at the cost of an unattractive and intrusive graphical elements) with the advantages of an overall aesthetic design (available in steganographic watermarking, but at the cost of limited payload and limited robustness).

In an implementation called Bitmorph™ Seal Encoding™ from EnSeal Systems Limited of the United Kingdom, the graphical symbols are called 'Bitmorphs'. Bitmorphs have the following unique properties which distinguish them over conventional glyphs and other forms of graphical symbol:

Bitmorphs are assembled into a decorative element, such as a picture, seal or signature.

Bitmoprhs can easily be made to blend into a decorative element because their shape can be altered (e.g. stretched, pulled out, twisted etc.) to fit around contours of the decorative elements. Hence, the curving border of a picture can use curving Bitmorphs. Bitmorph size and shape is automatically calculated to optimally fill a seal (sized to give maximum density consistent with adequate recognition properties; shaped to be as consistent with aesthetics as possible to blend in as effectively as possible).

Bitmoprhs can easily be made to blend into a decorative element because they are 'polymorphic' in that, for each bit or character which needs to be encoded, there are several possible Bitmorphs which could be selected and printed. Hence, light areas of a picture can use Bitmorphs with a relatively low density of pixels; heavy areas can use higher density Bitmorphs. An automatic process can select the optimal Bitmorph for a given region of a picture to be printed on a document by analysing an original of that picture and using Bitmorphs with the most appropriate appearance (e.g. pixel density; pixel arrangement—Bitmorphs with strong horizontal pixel arrangements where that fits in with the hatching scheme used in a picture etc.).

The above approaches lead to the maximum information density of the encoded information; further, it is compatible with the system being used, in particular with the resolution and the quality of the printers and scanners which are part of typical document transaction systems (e.g. high speed cheque printers and scanners; product labelling printers).

Bitmorphs themselves do not need to be individually recognised to initially register a scanning process accurately; instead registration or synchronisation is performed against the outline of the element which is formed from the collection of Bitmorphs. This is fast and robust.

With Bitmorphs, the information encoding process is controlled by a key which is unique to a user or group of users. The information is readable both when the seal is in electronic form and when it has been scanned from a printed version of the document.

The purpose of the encoding is typically to allow self-authentication of documents, particularly those such as cheques which involve financial transactions. The high information density possible with Bitmorphs allows small seals to be effective; it can therefore be used for stamp labels, such as postal stamps and electronic stamp labels (i.e. stamps which are not bought from a conventional Post Office, but are printed by a user from a PC) and other documents, such as IDs and passports, which also need rapid authentication. With many of these kinds of documents, only a relatively small proportion of the document area can be used for this kind of seal (e.g. less than 20%); the ICAO for example mandates a very limited region for authentication seals on passports.

The encoded information will generally relate to information printed elsewhere on the document which is human readable or 'overt (i.e. not hidden) and the authentication process consists of scanning the document, decoding the encoded information and comparing it with the human readable, overt printed information. For example, the name of the cheque payee is normally printed onto a cheque (assuming the cheque comes from a company or government body). With the present invention, that name is also encoded into a visually attractive element or pattern which forms a relatively small part of the cheque; it could be a signature, company logo, picture, word, trade mark, or seal.

The present invention is useful in 'positive pay' services; a positive pay service is where a banking customer sends to its bank the cheque numbers, payee and amount information for all cheques which it has issued; the bank then compares this data against all cheques actually presented and only makes a payment if it finds a match. The present invention can be employed at companies issuing cheques since it can be readily added into existing systems since (i) the computational load is light and hence can be handled without slowing down rapid, cheque printing systems and (ii) it needs only conventional laser printing (under suitable software control). Further, reading and authentication is also rapid and efficient with low computational load, again making it easy to integrate into existing banking authentication systems.

To recap, there are two important aspects to the Bitmorph implementation of the invention which differ from prior art solutions. The first (as noted above) is that the information to be encoded is placed into a feature that would ordinarily be present in a document such as a logo, a signature or an attractive picture etc. If no such feature is included in the design of the document then a feature compatible with the document's appearance, rather than a crudely apparent imposed security feature (e.g. a large block of unsightly conventional glyphs), is added to the document as a carrier of the information in a manner that will not adversely effect the aesthetic appearance.

Secondly, because graphical symbols have a variable size and shape and are polymorphic (i.e. there are several forms of graphical symbol coding for the same bit value or character), the information can be added at the maximum density and in a manner that is compatible with the system being used, in particular with the resolution and the quality of the printers and scanners which are part of the transaction system (i.e. the system for printing the documents and scanning them for authentication purposes). This contrasts with bar codes where the density is governed by the fixed characters and the frames that delineate the extent of the coding. The consequence is that the area occupied by the information is kept to a minimum or alternatively the amount of encoded data can be increased.

The high density of information necessitates a specially constructed error coding method as described below.

An implementation of the invention includes a system of authentication which is particularly, but not exclusively, usable in the case where the invention is used to authenticate bank cheques. The implementation includes a method of encrypting data and adding it to the seal, but on account of the high density, the whole of the information on the cheque may be embedded, allowing retrieval if some of the human readable information is corrupted. This contrasts with, for instance, U.S. Pat. No. 6,170,744 where a hashed version of the data is embedded; inevitably, this is just a small part of the available data.

A further implementation for high value documents (e.g. commercial agreements) comprises the addition of a seal, probably in the form of a company logo or similar item, into which is encoded selected information. Typically a document may consist of a standard text into which is added information related to a particular transaction, and it is this latter data that would be protected by the Bitmorph Seal Encoding'.

The high density of the encoded data in an implementation make it less easy to reproduce by standard copying and printing methods than a conventional bar code or glyph pattern. This is partly because the latter have fixed character sets to enable partially retrieved characters to be relatively easily restored: there are no fixed character sets in this implementation—a '1' can be represented in many different ways, as can a '0'. A further benefit of the present invention is that the error correction may provide a measure of the degradation of the original pattern from its electronic form. This provides an indication of the occurrence of counterfeiting because any reproduction of a cheque, however skilful, will tend to produce lower quality information.

As noted above, the pattern which is the heart of this invention can be made up of small units of information in a similar manner to that in which images are formed by dots in the standard printing process. The choice of information units allows the production of different visual effects whilst conveying the same information. The pattern may be superimposed on backgrounds of various colours thus allowing the design of the document to be minimally affected.

An important aspect of seal encoding is that it may be implemented cheaply with minimal impact on operational parameters. For many security applications, a significant factor in assessment of effectiveness is the rate of adoption by relevant agencies and a low impact, simple scheme may be more effective than a high security scheme with little take up. Bitmorph Seal Encoding offers the prospect of a simple scheme with a range of levels of security.

One implementation concerns documents such as certificates where aesthetic considerations are important and where significant information is contained. The requirement is to protect against falsification rather than copying and to have a convenient machine readable method of authentication. Included in this are insurance certificates, contracts, professional qualification certificates. The vital variable data on these certificates would be encoded in a seal which could match the style of the document In some countries personal documentation includes not only birth details but details of subsequent life events. These documents are prone to falsification and could be protected by a seal.

The seal encoding software would be supplied as a utility which can be attached as a "plugin" to word processing systems such as those producing "Word" or "pdf" documents. Typically, a word document, for instance, would have a fixed template for a certificate. To this would be added the variable data which describes the particular transaction. This data would be encoded in a seal which would become part of the Word document.

If such a seal were to be added to vehicle documentation it would enable police with hand held scanners to verify that no falsification of data had occurred.

BRIEF DESCRIPTION OF THE DRAWINGS

The present invention will be described with reference to the accompanying drawings, in which:

FIGS. 4 and 5A and 5B schematically illustrate how information is encoded into a template or seal;

FIG. 6 schematically illustrates the process of writing encoded information;

FIG. 7 schematically illustrates the process of reading encoded information at a bank;

FIG. 8 schematically illustrates the process of reading encoded information at a location remote from a bank;

FIG. 9 schematically illustrates the process of Bitmorph Seal Encoding.

DETAILED DESCRIPTION OF THE PREFERRED IMPLEMENTATION

Figure 1:
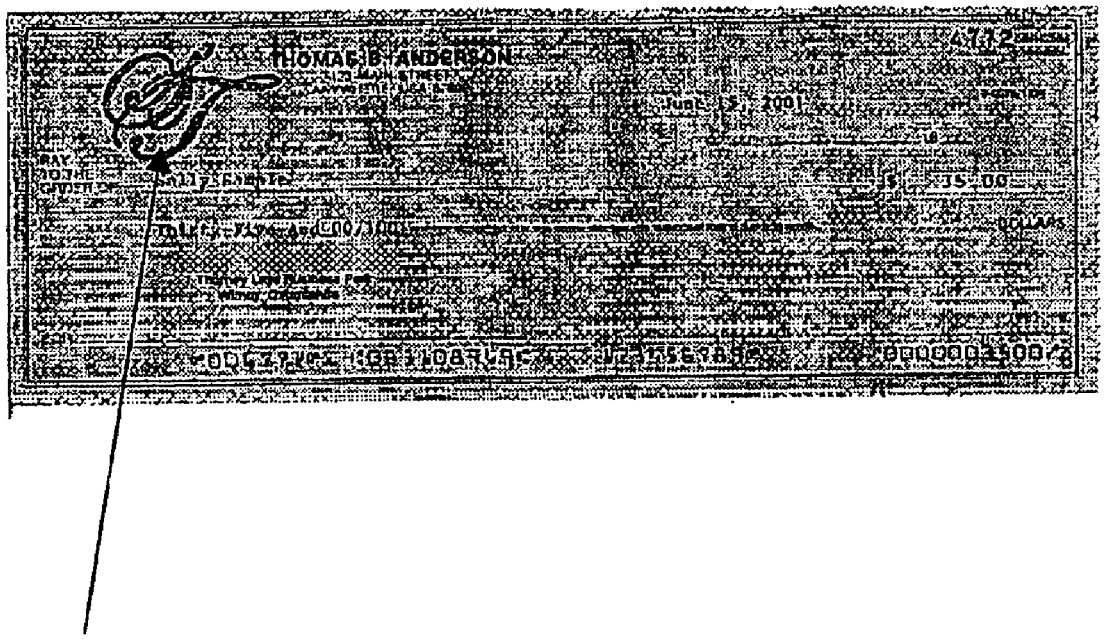
FIG. 1 is an image of a cheque document in accordance with the present invention, in which a symbol carries encoded information.

A description of the preferred implementation is given below. This implementation is called Bitmorph™ Seal Encoding™ from EnSeal Systems Limited of the United Kingdom. Bitmorph Seal Encoding provides a new method of embedding information into a seal or logo in contexts where neither a 2D bar code nor a digital watermark provide the required characteristics.

Bitmorph Seal Encoding provides a means of embedding a large amount of information into a compact symbol where the appearance of a conventional 2D bar code is unacceptable. The 2D bar code requirement for a set of predetermined characters (e.g. the industry-standard pdf417 bar code) is replaced by any form of printed logo, picture, seal, word etc. in which individual pixels are subtly varied according to the key used for encoding and the data to be encoded.

In essence, the Seal Encoding method comprises a process of scrambling the information to be added, followed by aggregation of the scrambled information into an element or template of the required form. The same information will appear in different forms within the image so that distortions due to the printing and scanning process may be taken into account in a calculated manner as opposed to simply taking some statistical average. The security of the method lies in the scrambling process which depends upon a key and upon the template. The key can be part of the data which is included in the document concerned or it can be part of a key management system such as PKI (Public Key Infrastructure). The template is required both for adding and extracting the information. The main way the key is actually utilised is by controlling the generation of the permutation and the generation of the random sequence used in the formatting of the data. As such it embodies the security of the operation.

Unlike digital watermarking, Seal Encoding does not rely on an image that is modified lightly to contain information but rather the information is assembled, at far higher density, to form the printed image. This method can be compared to print screening processes whereby dots are used in large numbers to build up a 'contone' image, but where the actual dot shape is to some degree arbitrary.

A major issue with all information embedding techniques is the robustness of the process. Information may in some instances be required to survive compression in addition to the printing and scanning process. In this respect, Seal Encoding embodies characteristics that lie between digital watermarking and 2D bar codes. Seal Encoding is far more robust than digital watermarks, which rely on correlation or other statistical processes to effect retrieval. Instead the encoded data is read directly from the seal with error correction included to prevent 'false positives'. Conversely, Seal Encoding is less robust than 2D bar codes because the characteristics of the seal are not part of a universal set of predefined codes. Consequently, after some degradation from, for example, photocopying, the data is less easily reconstituted without knowledge of the key than is the case with bar codes which use a known character set. With a 2D bar code, no knowledge is required of the encryption method to reconstruct dubious areas since the character set is fixed. The robustness of Seal Encoding can, however, be adjusted so that information will tend to be destroyed by illegal photocopying but will be retrievable in normal operating conditions.

The encoding process has several stages. The first process is to select a suitable design of seal—i.e. the element to be made up of large numbers of individual Bitmorphs. For implementations where maximum information density is required, the next process will be calibration of relevant hardware. Then, the system looks at the space available in the seal and works out the optimal arrangement of internal cells within the space. Each cell is effectively a blank Bitmorph—i.e. a group of pixels of potentially variable size, shape and appearance. The actual data to be encoded then passes through several phases. Firstly the data is converted into suitable arithmetic form, commonly a binary string. Error correction is added to overcome the known degradations brought about by the processing. Encryption using PKI methods may be introduced to provide security, a variety of possible scenarios for encryption can appear in different embodiments. The system records both the external border of the seal and the internal cell positions. It then creates the Bitmorph seal by printing the seal onto the document A detector is provided with the external border information and the internal cell structure; it uses the external border information for registration, often termed synchronisation—the process of lining up the seal border outline stored in memory against the image to be tested until correlation indicate s alignment Once aligned, the detector, using its knowledge of the cell positions, reads the values of each Bitmorph in the seal. The details of these stages are given below.

Choice of Seal

Figure 2:
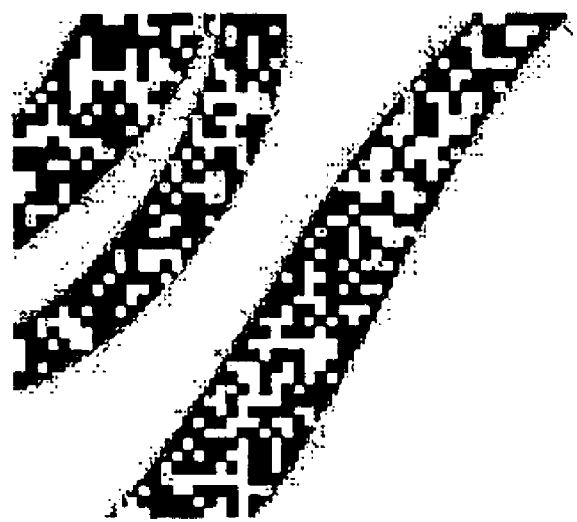
FIG. 2 is a magnified part of that signature, showing the array of black and white pixels (Bitmorphs) which encode information
Figure 3:
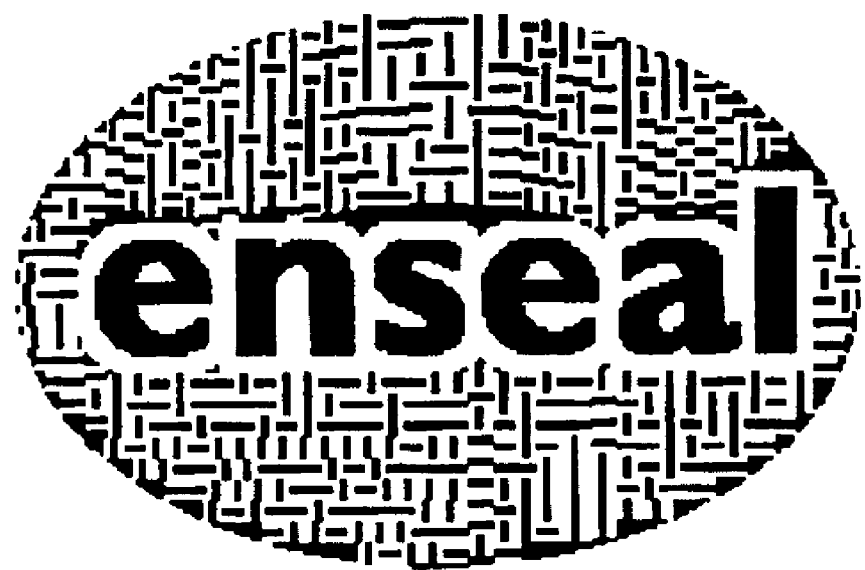
FIG. 3 is a magnified image of a corporate logo, in which the background carries information encoded as Bitmorphs.

A pattern such as a signature, picture, word or seal is selected to provide a template into which the information is to be encoded. In many instances, the pattern is one that had already been designed as part of the document. To avoid repetition, the term 'seal' will generally be used in the coming sections. The seal, in fact, is merely a silhouette designating an area to be used to contain information and as such is to be compared with the bounding lines of a bar code. In FIG. 1, the seal is the initials at 1. A portion of these initials is shown magnified in FIG. 2; the fine structure of Bitmorphs which carry the information payload is clearly visible in the magnified image, although it is barely perceptible in normal size. FIG. 3 shows a corporate logo for EnSeal, with the background showing individual Bitmorphs. The size of Bitmorphs in FIG. 3 has been increased beyond the normal to allow the fine structure to be seen more easily.

The encoding process replaces each pixel of the area within the seal by a colour selected from a palette of two or more, the colours depending upon the inks available at the relevant stage of the printing process. In the case of bank cheques, a black and white laser printer is normally available and so the pixels may simply be black or white or may contain a grey level generated by the standard screening process.

Documents using any selection of ink colours are possible, as are shades of intermediate colours generated by screening, but for ease of retrievability the range of colour must be carefully controlled.

The seal may be placed on a blank background, but there is no difficulty if it is added to a preprinted document, as for instance a cheque, where there may be an underlying pattern which is visible between the lines of the seal. Such backgrounds may be beneficial in making the seal more difficult to copy.

Implementations of the invention described here assume that the seal can be described by a binary array with the binary characters selecting one of two possible colours. It is a simple extension to the use of more levels of colour, using 4 levels of grey or other selected colour, for instance, instead of black and white only.

Encoding and Decoding Using the Template

The diagram at FIG. 4 indicates the processes. The original template is a silhouette in black and white. Rules for subdivision into cells are adopted. In this case, cells are rectangles with fixed height of 3 pixels, minimum width of two pixels and maximum width of five pixels. A cell contains an individual Bitmorph. The resulting subdivision of the template into 5 cells is shown in (b). There are remaining black edge pixels which are not encoded.

In this example, the digit '1' is represented by a Bitmorph with a vertical stripe and the digit '0' by a Bitmorph with a horizontal stripe. The figure at (c) shows how the Bitmorphs are added to the cells to represent the code 10010. This is summarised in the following table:

| Bitmap | Cell dimensions | Stripe imposed on cell | Bit value |
|---|---|---|---|
| B1 | 3 × 2 | Vertical | 1 |
| B2 | 3 × 3 | Horizontal | 0 |
| B3 | 3 × 5 | Horizontal | 0 |
| B4 | 3 × 3 | Vertical | 1 |
| B5 | 3 × 4 | Horizontal | 0 |

The information that is sent to the decoder is in different form to that in the encoder to prevent the simple reverse engineering of the template writing. The decoder is provided with the map of the encoding cells. It is also provided with the number of pixels in each row and column of the template. Although not a unique description of the template it is sufficient to enable the synchronisation of the scanned template. The scanned template may need to be rotated or rescaled to fit the original. The process is partly one of trial and error to achieve the best correlation with the row and column numbers.

The cells can then be identified by the decoder and the Bitmorphs analysed to see whether they correlate best with the horizontal or vertical stripes.

Calibration of Printers and Scanners

Encoded seals are generally used in closed systems with a known range of hardware and since they are designed to have high information density it is important to know the characteristics of the apparatus available.

Calibration of printers is carried out by printing from electronic files containing known features which test the ability of printers to function accurately. In particular very fine lines and grids test the 'dot gain' in a printing process, that is, the extent to which ink spreads beyond the intended boundary, this depending also on the type of paper on which the printing takes place. Thus a chequer board of sharp black and white squares will become a less sharp combination of black and grey. There are mathematical models for dot gain which will allow print drivers to correct for ink spread and so the type of driver used will be part of the limitation on accuracy.

Calibration will also be dependent upon the way in which data is screened and rasterised before being finally printed. In particular the use of customised fonts as a means of efficiently producing required patterns requires its own detailed study for calibration purposes.

By measuring the output of printers at different resolutions and measuring how many effective different grey levels are achievable it is possible to calculate the resolution at which the highest information density can be output by a printer.

Calibration of scanners is carried out by scanning prepared documents with similar features to those mentioned above. If scanning resolution is low, black and white features become blurred and information is lost Similarly if there are irregularities, in the lead screw of a flat bed scanner, for instance, a level of randomness is introduced into the results which restricts the detected information.

In the particular case of high speed scanners used in the sorting of bank cheques there may be built in functions which attempt to fill in any gaps in scans which the software supposes to be accidental. Calibration has to recognise these characteristics and Seal Encoding has to be adapted to cope with the effects. There may be considerable degradation of scanned data through the use of compression techniques or the use of black and white rather than contone data.

As a result of such calibrations, a function can be determined which shows the relationship between resolution, screening process and information density. From this the optimal resolution for a given system can be determined and this information assists in designing the embedding process for the pattern.

A refinement of the process of reading characters may be achieved by using calibration cheques, or calibration documents depending upon context. A set of calibrating cheques may be encoded using the selected graphical symbols representing a known data string. The cheques will then be printed and scanned in the environment in which the cheques will be handled. Now although the original electronic form of the code will be sharp and clear, the form that emerges from the scanning process may have considerable distortion and general degradation. Supposing, for instance, there are two types of character, type A and type B, which need to be distinguished for decoding purposes. After the printing and scanning processes the shapes may well be very different from the originals and may need to be the subject of careful analysis in order to decide which type is present Typically a calculation of the correlation type is carried out to produce a differentiation index. As an example the index may be calculated to give values between 0 and 100 and it may be that if the index is less than 50 the character should be classified as type A, and if greater than 50 as type B.

In practice there may well be several characters of type A than give an index greater than 50 or characters of type B that give an index less than 50. The calibration process works by examining the distribution of index values corresponding to the characters that are known to be of type A, and similarly for type B. The result will be two curves which should be roughly Gaussian with the maximum for type A characters with an index less than 50 and the maximum for type B characters greater than 50. The errors in recognising characters are where the two curves overlap. The first part of the calibration is simply to find a threshold for the index which produces the fewest incorrect characters, i.e to increase or decrease the theoretical threshold according to the empirical values.

The calibration can become more sophisticated if it takes into account the different possible configurations. For instance, it may be that when a type A character has a type B character immediately above it and one immediately to the left that there is a degree of distortion caused by the spread of ink or by software infilling by the scanner. These configurations can be analysed by the calibration software and new thresholds calculated. The thresholds can be calculated for configurations that include the effect of being at the edge of a template, or cases where graphical symbols have been modified to accommodate features in the template. The calibration can thus overcome to a large degree the shortcomings of the printing and scanning process. Careful choice of the index is also a vital consideration.

Preparation of Data for Encoding

The first stage of data preparation is to take the data to be encoded and reduce it to a set of characters from a known alphabet, or to a binary string in the case where encryption is to be used. In this form, error correction techniques can be applied. The advantage of working with characters is that corruption of individual characters can sometimes be countered with the use of additional information from optical character recognition or the like.

Error Correction

Bitmorph seals operate at the greatest resolution that can be achieved by printers and scanners in the particular context where they are implemented. One advantage for this is that it is much more difficult to make a copy that will have precisely the same characteristics as the original. It is also possible to devise sensitive measures of the degree to which the original information might have been degraded.

A consequence of this form of encoding is the need for a sophisticated information retrieval methodology including an error correction method adapted for the particular context.

The basic situation is that a binary string is encoded into a document in such a way that a '1' and a '0' are each represented by a different colour, shade or arrangement of pixels. Thus a '1' may be represented by a black pixel and a '0' by a grey pixel. These pixels are printed on the document within a template to constitute the seal.

There are three particular types of error that occur when attempting to retrieve the binary string from a document that has been scanned. These are:

(i) The location and orientation of the seal are affected by the printing and scanning process. The printing process may cause distortion of the paper, particularly if an absorbent rather than a coated paper is used. A scanner, particularly if it is a cheap flatbed scanner, may have a slightly distorted aspect ratio and irregularities in the direction of travel of the scanning carriage. High speed scanners often produce a small rotation in imaging due to the rapid motion of the document being scanned.

(ii) The pixels may suffer from 'dot gain,' i.e. the tendency of ink to spread, and thus the actual values of grey, for instance, will vary according to the number of black surrounding pixels. Similarly the CCD's in a scanner tend to produce an elision of pixels with their neighbours. The scanner characteristics referred to above may have severe effects on particular types of pattern.

(iii) There may be localised or generalised degradation to the seal by any spots of dirt or coffee stains or such that might arise from normal casual usage.

The first two types of error are dealt with later but to overcome the third type requires modification of the input data as described in the next section.

Addition for Error Correcting Terms

The problems of localised degradation are dealt with by an adaptation of the highly developed theory of error correction.

The basis of error correction theory is the idea that n bit codes form an n-dimensional space where a distance between any two codes can be defined. A standard method of describing the distance is the 'Hamming Distance'(HD) and this simply counts up, for any pair of n bit codes, the number of positions in which the bits differ. Thus 11110000 and 01110001 would have a Hamming distance of 2 because they differ in their first and last positions.

To be able to correct a received code a set of codes is produced where no two codes have a mutual HD of less than a selected amount, e.g. 3. Thus if a code is received with a single error it is possible to allocate it to the nearest acceptable code.

The correction scheme which is used as part of this invention generates a set of codes with a given minimum distance as described above. In order to minimise the number of bits the codes are not necessarily linear. This affects the ease with which decoding takes place but in the implementations considered here the data is split into small codes where complexity of retrieval will not be an issue.

Where the input information is in the form of characters, the correction codes are chosen to give maximum efficiency for the particular alphabet they are required to represent, and this is often important where it is necessary to retrieve individual symbols rather than concatenate a whole message. Thus if it is required to encode an alphabet of upper case letters together with the digits 36 symbols would be required. It is possible to produce 48 codes with minimum Hamming Distance of 6 using only 14 bit codes. A further refinement is achieved by using a 'soft decision' method of decoding. Whereas a 'hard decision' method involves the attribution of the values '1' or '0' to the quanta of information obtained from a scan, the 'soft decision' method attributes one of a range of values according to the scan data. At its simplest a scan of a pixel might give a value between 0 and 255 depending upon whether it was white, grey or black. If, however, a group of pixels were to represent a character chosen from a range of possible characters a value might be attributed to the character which represented the extent to which it best fitted one of a known alphabet of characters.

An important implementation of the invention is in contexts where the data on the seal is corroborated by other forms of data on the document. An example of this is the case of cheques where data may appear as text The text becomes machine readable by the use of OCR software. Now certain letters such as O's and Q's or E's and F's are quite frequently confused in cases where scan quality is low. In these cases a combination of the seal and the OCR may be required to determine the intended character. To aid this process the codes which are chosen to represent letters which are visually close will be those with large mutual Hamming distances. In this way an error in the one machine reading process is unlikely to be duplicated in the other process.

A second adaptation is that the codes are permuted before being applied to the document so that if any 'burst errors' occur then they will be distributed sparsely among a group of codes and hence will be correctable by minimising the Hamming distance. In the context of a document the burst errors will be where there is, for instance, an area that is darkened by some external means. The result will be that the bits which make up a single character will be scattered throughout the seal so that areas of degraded quality can be compensated by areas of good quality.

The correction scheme which is used as part of this implementation generates a set of codes with a given minimum distance as described above. In conventional error correction schemes the codes are 'linear,' which means that if two codes are combined in a particular way then a further code having the required properties will be formed. The purpose of this is to simplify decoding when large sized samples are being handled, otherwise a very time consuming search would have to take place.

In many implementations using the present invention, the codes will be small enough to enable a thorough search to locate the most likely value without being concerned about the time penalties.

If non-linear codes are permitted there is a greater freedom of choice for the same minimum Hamming distance between members of the set of acceptable codes. It is also more easily possible to tailor the codes to fit the number of characters being encoded. This will result in codes requiring fewer bits for a given minimum Hamming distance. The overall effect is to use a minimum number of encoded bits yet still be able to correct a large number of contingent errors. Where the input information is in the form of characters the correction codes are chosen to give maximum efficiency for the particular alphabet they are required to represent Formatting of Data The data, having been prepared with the error correction included, may be in a suitable mathematical form but may well also have very uneven distributions of '1's' and '0's' which present problems in the printing and scanning process and have an unacceptable appearance.

To overcome this problem the data is randomised by some means. In one implementation the binary string is divided into lengths of a chosen fixed size, perhaps, but not necessarily, 8 bits long so that each string represents a character. A random number generator is used to generate an array of random 0's and 1's. This string is XOR'd with the character string to produce a further encoding.

The data that has been prepared will, in many implementations, be expressed in fewer pixels than are available in the seal. For this reason the data is repeated as many times as is necessary to fill the seal. This helps with the correction of errors of the first and second type enumerated above as indicated in the section on detection below.

Character Encoding

Having calculated a binary string using error correction methods and random adjustment it is necessary to decide on the actual physical forms that will be used to represent the values '1' and '0.' At its simplest, for instance, a single pixel might represent the values using black or white in the normal fashion.

At the next stage of complexity, a group of pixels may represent a '1' or '0', or may represent a binary string. The nature of this group is chosen to reflect the calibration characteristics of the printers and scanners. The distinction between this selection of codes and the previous selection of codes for error correction is that we are here dealing with the physical way in which the data is added to the paper in a very localised fashion.

In one implementation, the binary string is divided into lengths of a chosen fixed size. Thus the strings may be 8 bits in length, giving 256 possible characters. These 256 characters are then replaced by an alphabet of information units. These units can be selected to have the required error correction level in terms of their visual distinctness, and required visual qualities in a general aesthetic sense.

By way of example, in a black and white image, if the information units are chosen to contain 12 bits it might be decided that to achieve the required visual intensity there should always be 4 black and 8 white bits. These could be arranged in any convenient array such as a rectangle, but they may also be arranged in an irregular but compact figure to fit within the constraints of the template. The resulting visual effect would be of a 33% grey tint There are 495 codes that have 4 black and 8 white bits and hence all 256 characters can be encoded and there would be some redundancy. When trying to retrieve the information units a fist check would be that only one of the selected alphabet characters is allowable.

In one implementation the original codes are mapped onto the alphabet codes using a function controlled by the key.

It might be that a higher level of error protection is required. In this case the information units could perhaps be 16 bits long and 5 of these could be taken to be black, providing 4,368 possible codes. With this degree of redundancy it is possible to select codes in such a way that the Hamming Distance between any two codes is maximised. This allows corrections to take place to counteract such distortion as occurs through stretching of paper or scanning with altered aspect ratios. Although a character may be distorted the scan should still give a result closer to the required character than to any other member of the alphabet.

As each character is detected, the degree of geometrical distortion can be assessed and used to facilitate detection of the next character.

An important aspect of Seal Encoding is the dependence of the encoding characters on the template and the manner in which the template is subdivided. This is best illustrated by an example. Suppose that a method of encoding 4 characters is required; the characters might be thought of as binary numbers 00, 01, 10, 11 or maybe as letters a, b, c, d. For each character a recognisable pattern must be placed on the document.

Suppose that the printing process produces pixels that are black or white and that it is required to produce the appearance of 50% grey. This would mean that if patterns of 6 pixels represented the characters, 3 of those pixels would be white and 3 black.

Proceeding as above, one might produce 4 binary strings, one to represent each of the characters. Thus we might have:

'a'=000111: 'b'=011001: 'c'=101010: 'd'=110100

If on paper a '0' were represented as a white space and a '1' as a black dot, then each of these characters would be 50% grey in appearance. This is part of Seal Encoding's method of achieving an appearance compatible with aesthetic requirements.

These codes have also been chosen to have a Hamming distance of 3. The effect of this is that if the code for 'a' were to be damaged by the first 0 becoming a 1 the string 100111 is still closer to the representation for 'a' than for any other character.

If now the template were to be divided up into 3×2 rectangles the codes would appear as illustrated in FIG. 5A(a). However, if an alternative subdivision were to be made as in FIG. 5A(b) then the same codes would be represented by different patterns. The algorithm for subdivision must, of course, be known to both the encoder and decoder.

In cases where the quality of the scans is low, Bitmorph Seal Encoding allows the possibility of using characters specifically designed to withstand particular forms of distortion. For example, on some high speed scanners the scanner software infills small gaps in the data in a horizontal direction. For this reason, the characters that are used will tend to be made up of lines rather than uncoordinated groups of dots. The characters will, nonetheless, be adapted to fit into the shape of the template rather than be of a fixed type. This is illustrated in the final stage of FIG. 5B.

In preparation for printing, the data that has been calculated is generally converted into a rasterised format. In general, for an image, the printer's associated software screens the data, that is to say it is converted into sets of dots which are themselves built up of the smallest printable dot that the hardware can apply. However, it is possible to prepare the data in 'bitmapped' form in exactly the way in which it is to be printed, bypassing the screening process. In some implementations this method is used to achieve the required quality of seal encoding.

In another implementation the data is processed in the same way that text is processed, i.e. by having prepared fonts which are downloaded to the printer. In the case of a Bitmorph seal, these fonts are specially prepared to achieve the required geometrical effect The fonts are not letters but are groups of pixels carefully arranged so that by combining them any geometrical effect can be produced. Passing the data in the form of fonts enables the Seal Encoding to combine with the workflow in a particularly simple manner.

Figure 5B:
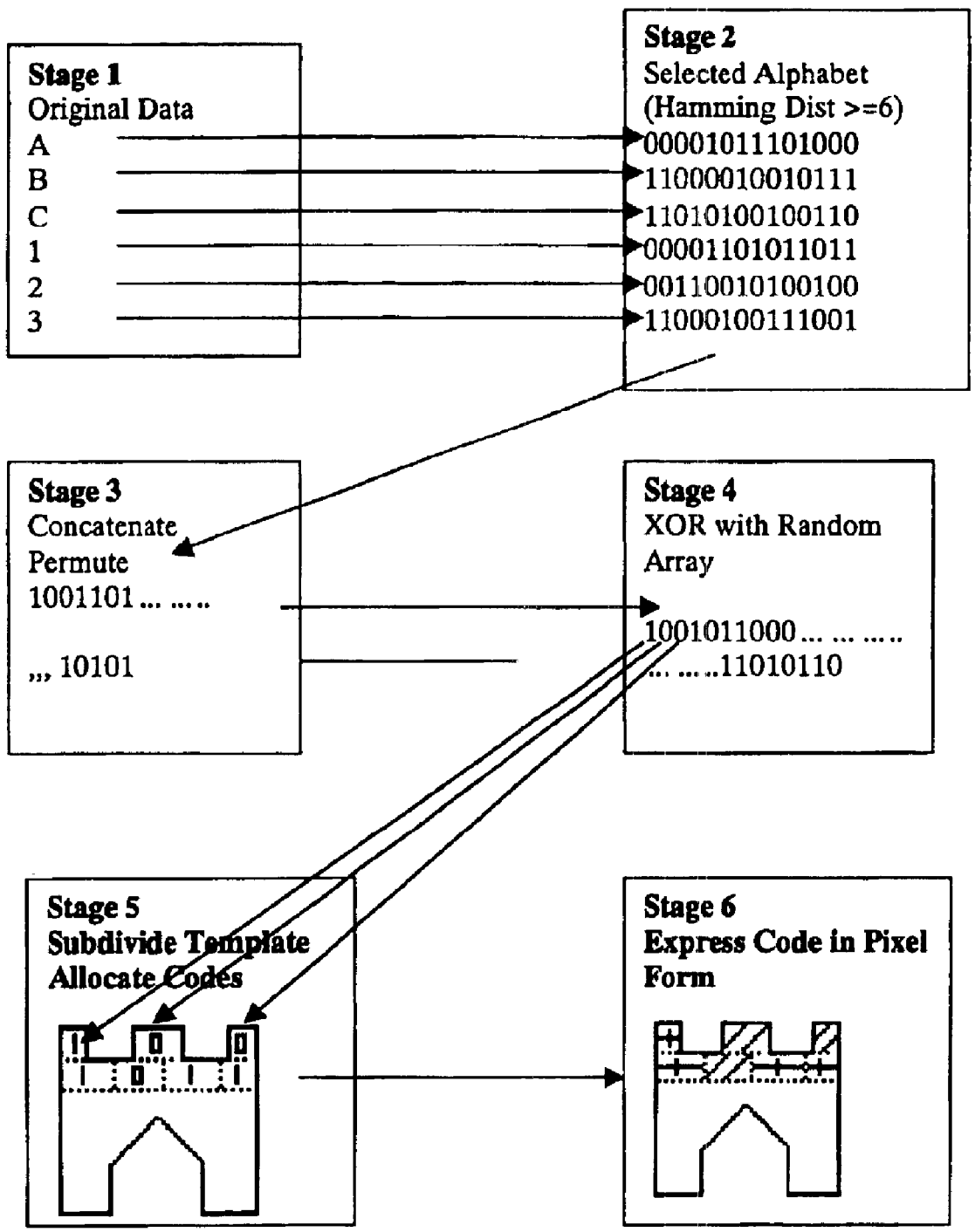

FIG. 5B illustrates one implementation of the process.

In stage 1, the data to be added is in the form ABC123.

In stage 2, an alphabet has been selected to represent these values. This particular alphabet uses 14 bits per character. Thus 'A' is represented by 00001011101000 and '1' is represented by 00001101011011. Their Hamming Distance is 6 because they differ in the $6^{th}$, $7^{th}$, $9^{th}$, $10^{th}$, $13^{th}$ and $14^{th}$ bit positions. This means that even if the string for 'A' were to be retrieved with two errors it would still be distinguishable from the string for '1' which would have at least 4 errors.

In stage 3, the bit strings are concatenated. A permutation is then applied to the bits, the permutation being one of the parameters that can be varied for each application but must be known both to the encoder and decoder.

In stage 4, the binary string is exclusive OR'd with a random array, so that the 1's and 0's are distributed in an equable fashion. Again the random array is a parameter that has to be known to both encoder and decoder.

In stage 5, the template is subdivided into areas of sufficient magnitude for the embedding of shapes that are distinguishable by the available scanners. The areas do not have to be of precisely equal size nor need they be of the same shape (Bitmorphs can have variable size and shape—they are not a fixed character set, but take their size and shape from the cell size and shape, and that is automatically calculated in dependence on the size and shape of the entire seal or significant features within it). However, the algorithm that governs the subdivision must be common to both encoder and decoder. Each of the subdivisions is allocated a '1' or '0' according to the binary string that was produced in stage 4.

In stage 6, the bit values are replaced by Bitmorphs, i.e. arrangements of pixels. The value '1' in this case is roughly represented by a cross. The crosses need not be the same shape or size. All that is necessary is that some shapes are recognisable as representing 1's and some as representing 0's. The choice of Bitmorphs shape reflects the characteristics of the printing and scanning process. There would be no point, for instance, in representing bits by very fine structures if the scanners simply merged all the pixels together. On the other hand, if the document in question were to be a high value document that will be scanned on a high resolution scanner then the chosen patterns could be complex and fine structured and could give an appearance commensurate with high aesthetic requirements.

Reading of Seal

The seal is read by scanning in the document and more or less reversing the processes described. However, errors of type (i) and (ii) in the section above titled 'Error Correction' need to be addressed before the decryption processes.

The orientation problem can be overcome by correlating line by line the scanned data and the original template. This provides a very fine adjustment, augmenting the information obtained by knowledge of the coordinates of the original inserted seal.

Where groups of pixels of a selected alphabet are used to represent bits or strings, small adjustments to location and orientation can be effected by requiring that each character read is indeed a member of the defined alphabet. Thus a character is assumed to have a calculated position with respect to the template but on account of distortion of paper or inaccuracy of location of the scanner the character may be slightly higher or lower than is originally supposed. Given that any character has to be one of a fixed alphabet the scanned data can be raised or lowered until the observed pattern of pixels coincides with a legal character. This displacement is then used to predict the mis-location of subsequent characters.

In addition, the fact that the data has been repeated permits the use of correlation between different parts of the seal to compensate for other distortions.

In the implementation where a group of pixels represents a bit (or string of bits) of information, the next stage of the detection process is to identify which member of the selected alphabet corresponds most closely to the group of pixels from the scan. This is typically carried out by the use of a simple correlation calculation. Thus for each group of pixels there will be a value attributed which expresses the probability of that group representing a '1' or a '0'. A similar situation occurs when a single pixel represents a bit The next stage of the decoding is to reverse the permutation that had distributed the error corrected binary data over the document.

The decoding of the error corrected data requires finding the code with the minimum Hamming distance, using probabilities based on the values in the scanned data. Thus where a single pixel represents a bit on some occasions error correction may indicate that a dark grey pixel should correspond to a '0' rather than a '1'. The total amount of adjustment in carrying out a decode is assessed and gives an indication of how much degradation the image has undergone through processing. This in turn gives an indication of the likelihood that the document has been copied or otherwise deliberately corrupted.

The calibration data for the scanners and printers can be used to correct dot gain errors that might have occurred.

The decoding software must have knowledge of the seal template and of any keys that have been used in the encryption.

Security

In most implementations the seal is used as a security device.

At the system level, the security lies in the fact that the seal contains information which is present in a different form elsewhere on the document and the document is authenticated by comparing the two forms of the information. Thus, on a cheque, payee names might be machine read by using OCR software, and this information might be compared with the payee name stored in coded form in the seal. Alternatively an account number might be read from the MICR line and similarly compared. The self consistency of this information gives confirmation of its integrity. As mentioned above predictable errors in OCR deciphering may be taken into account by the seal decoding.

The security of the seal itself may be protected either by encryption or by control of the encoding parameters.

In one implementation, the data to be encoded is encrypted either wholly or in part prior to the encoding process. This can be done using a PKI system so that the agencies who decode the data have no access to the private key required to write the data. In one implementation the public key is printed on the document so that decryption can take place without reference to any remote database.

In one implementation, the encryption is carried out using elliptic curve cryptography. This allows the usage of a smaller key allowing more space for other information.

Where there is no encryption, the security consists in controlling access to the permutation carried out as part of the error correction. This has the advantage that errors in single characters do not damage information in other characters, whereas if characters are concatenated for encryption purposes the loss of one small part of the data results in the loss of the whole data string.

In alternative embodiments, the template, error correction method, permutation and random array for data condition are all utilized in the encoding and decoding of the seal. Typically the encoding software will be used in a location which is secure and where the parameters corresponding to a particular application are available to download to the software. The decoding software will tend to be available at less secure sites. The risk to security is that the decoding software will be reverse engineered to produce an encoder. This requires a high degree of engineering skill. However, to raise the level of security less information has to be released to remote sites.

In one implementation the remote sites have the means to decode data as far as the permutation, that is to say they can undo stages 6, 5 and 4 in FIG. 5B. The binary string is then transmitted over a secure network to an authenticating server which returns the string with the permutation undone so that the remainder of the decoding can be accomplished.

Where there is a group of banks or a set of accounts attached to one bank, it will be necessary to store the encoding parameters for each account. These parameters will be indexed according to a bank identifier, typically the Bank's routing number. In order that the banks may vary the parameters they will also be indexed according to the date.

Bitmorph Seal Encoding for Bank Cheques
Overview

Bitmorph Seal Encoding can be applied to encode information into cheques as they are being printed with payee and amount information. This final section explains this particular use of the invention in more depth.

Bitmorph Seal Encoding can provide security at two levels, the lower level depending upon the seal encoding parameters and the higher level depending on a form of encryption. Where reconciliation takes place at the issuing Bank the encryption parameters will be available allowing validation to take place automatically as a batch process. Where validation is required at Cash Shops or other remote agencies the higher level of security can be accessed but only by on line contact with the Issuing Bank or a Certification Authority.

Implementation

The parameters for encoding, including a database of identifiers for particular Banks, or Corporate accounts administered by those Banks, are held either at the Bank itself or by a Certification Agency.

The processes for writing and reading Bitmorph Seals are as described below.

Writing (FIG. 6)
1. The Issuing Bank's MICR routing number, and possibly an account number, are used to index the template, the random number generator (RNG) and the CodeBook.
2. A generic permutation agreed between banks is used along with the above parameters, to encode the date and routing number in the seal.
3. A second permutation is generated as a function of the date, routing number and a random number which acts as an identifier (ID) for each Bank or corporate client of the bank. These three entities are hashed and the value so calculated is used in a fixed algorithm to generate a permutation unique to the account
4. Using the new permutation the rest of the data, i.e the payee, value and account details is encoded into the seal.

Reading (At Issuing Bank) (FIG. 7)
1. The Bank's routing number and possibly an account number is read from the MICR data and used to obtain the template, the random number generator (RNG) and the codebook.
2. Using the above parameters the date is read from the seal.
3. The routing number and date, together with the Issuing Bank's ID, are used to generate the unique permutation.
4. The remainder of the data is decoded with the aid of the unique permutation.

Reading (At Cash Shop or other Remote Agency) (FIG. 8)
1. The Issuing Bank's routing number, and possibly an account number, is read from the MICR data and used to obtain the template, the random number generator (RNG) and the codebook.
2. Using the above parameters the date is read from the seal.
3. The template and RNG are used to begin the decoding of the remaining data to the point between stages 3 and 4 (see diagram—'Processes of Seal Encoding' FIG. 9) where the reverse of the permutation needs to be applied.
4. The binary string thus obtained is sent to the Issuing Bank along with the routing number and the date. The Issuing Bank returns the string with inverse of the unique permutation applied.
5. The remainder of the data is decoded by reversing the encoding process.

Authentication

The data may be authenticated by comparing the corresponding fields as decoded from the Seal, the MICR data and the readable text data.

Detail of Encoding Process

FIG. 9 gives a diagrammatic view of the encoding process.

The Seal Encoding is governed by a template and 3 parameters:
  (i) The codebook for error correction
  (ii) A permutation for distributing the encoded signal
  (iii) A random sequence for conditioning the signal to be printed.

Two permutations are required. The first is a fixed permutation which is available for all users and is used to encode the date and Bank routing number.

The second is a permutation which is unique to a Bank or an Account at that Bank. This permutation is used to distribute the remainder of the data. This second permutation is produced via a hashing process which depends upon the date, the Bank's routing number and an Identifier associated with the account in question, although if the Identifier is indexed through the date and routing number there could be some redundancy here. Any reputable hashing algorithm may be used to distribute the hashed values uniformly through the available hashing space. The crucial point is that nobody could take sets of published cheques and reverse engineer a permutation. There is a potential risk that past values of Banks' Identifiers will be obtainable so that cheques could be produced that are a few days out of date. It may be that there will be a strict cut off for the time allowed for presentation of cheques.

The main reasons for embodying the security in the permutations are twofold.

First, the payload for seals is limited by aesthetic considerations and the use of permutations maximises the compactness. The payload is also limited by memory considerations; cheques are preprocessed for the printing process so that records contain the images to be added and the large number of cheques imposes a practical limit on the size of the images. An alternative would be to process images at the time of printing but this would tend to slow down operations.

Secondly, the seal data is used in conjunction with other forms of data, MICR data and text data, and extracting data from damaged cheques can be considerably enhanced by intelligent combination of these sources. The permutations allow processing of damaged data in a way which is not possible with standard encryption. Note that the contact with the Bank required by Cash shops is completely separate from any account information and hence should be less problematic for access purposes.

What is claimed is:

1. A document printed with printed matter comprising (a) graphical symbols which encode information but are not human readable and (b) a visible element, wherein the graphical symbols are formed into some or all of the visible element and an outline of the element is used for synchronizing an automated process for scanning the document to extract the encoded information from the visible element.

2. The document of claim 1 in which the visible element is a logo, word, number or signature.

3. The document of claim 1 in which some or all of the graphical symbols are superimposed on a decorative background printed on the document.

4. The document of claim 1 in which the graphical symbols are printable using a printer used to create the document.

5. The document of claim 1 in which at least one of the graphical symbols is a font which is downloadable to a printer used to create the document.

6. The document of claim 1 in which a density of encoded information is such that if the document is copied using a standard scanner and then printed using a standard ink jet/laser printer, the visible element will not be readable on account of global degradation.

7. The document of claim 1 in which a density of encoded information is such that if the document suffers local intense degradation, an error correction scheme enables the visible element to be read.

8. The document of claim 1 in which a permutation algorithm is used to distribute the graphical symbols within the visible element in a complex manner.

9. The document of claim 8 which is scanned at a given physical location and an inverse permutation applied at a different and more secure remote location.

10. The document of claim 8 in which the decoding is assisted by information derived from OCR (optical character recognition) or reading of MICR (magnetic ink character recognition) information printed on the document because the permutation method allows a recovery of individual characters even where some are corrupted by processing.

11. The document of claim 1 in which the visible element occupies less than 20% of the entire surface of the document.

12. The document of claim 1 in which at least some of the information encoded into the visible element is also present in printed, human readable form on the document.

13. The document of claim 12 in which part of the information present in printed, human readable form on the document is encrypted and used to generate a permutation for the remaining information to be placed into the visible element.

14. The document of claim 13 where the encryption is part of a PKI (public key infrastructure) scheme.

15. The document of claim 13 where the encryption is an elliptic curve cryptosystem.

16. The document of claim 1 in which the information is encoded at a maximum density permissible.

17. The document of claim 16 in which a maximum density is determined by a calibration program.

18. The document of claim 1 in which the information is encoded into the visible element using error correction.

19. The document of claim 18 in which the error correction is non linear.

20. The document of claim 18 in which the error correction depends on a probability metric based on scan data.

21. The document of claim 18 in which the error correction allows, during decoding, a calculation of a probability that the document has been fraudulently reproduced.

22. The document of claim 1, the integrity of which needs to be capable of verification.

23. The document of claim 22 in which the document is a check and the information includes one or more of the following kinds of information:
 (a) name of the payee;
 (b) value of the check;
 (c) date of the check;
 (d) an account number.

24. A method of printing a document with printed matter comprising (a) graphical symbols which encode information but are not human readable and (b) a visible element, the method comprising the step of (i) computer generating the graphical symbols; (ii) forming the graphical symbols into the visible element, so that an outline of the visible element is used for synchronizing an automated process for scanning the document to extract the encoded information from the visible element and then (iii) printing the graphical symbols onto the document.

25. A method of retrieving information from a document printed with printed matter, the printed matter comprising (a) graphical symbols which encode information but are not human readable and (b) a visible element, in which the graphical symbols are formed into some or all of the visible element such that an outline of the visible element is used for synchronizing an automated process for scanning the document to extract the encoded information from the visible element;
 the method comprising the steps of (i) scanning the visible element, (ii) using the outline to achieve synchronization , and then (iii) retrieving the information by decoding the graphical symbols which make up some or all of the element.

26. The method of claim 25 further comprising the step of comparing information decoded from the visible element to human readable information printed on the document.

27. The method of claim 25 further comprising the step of comparing information decoded from the visible element to information which is indexed by human readable information on the document.

28. The method of claim 25 further comprising the step of comparing information which is indexed by the decoded information extracted from the visible element to human readable information printed on the document.

29. A computer software able to control a printer to print a document with printed matter, the printed matter comprising (a) graphical symbols which encode information but are not human readable and (b) a visible element;
 in which the software is able to (i) generate the graphical symbols; (ii) form the graphical symbols into the visible element, so that an outline of the visible element is used for synchronizing an automated process for scanning the document to extract the encoded information from the visible element and then (iii) cause the printer to print the graphical symbols onto the document.

30. A computer software able to control a decoding system to retrieve information from a document printed with printed matter, the printed matter comprising (a) graphical symbols which encode information but are not human readable and (b) a visible element, in which the graphical symbols are formed into some or all of the visible element such that an outline of the visible element is used for synchronizing an automated process for scanning the document to extract the encoded information from the visible element;
   wherein the software can control the decoding system (i) to scan the visible element to generate scan data, (ii) to process the scan data by determining an outline of the visible element to achieve synchronization, and then (iii) to retrieve the information by decoding the graphical symbols which make up some or all of the visible element.

* * * * *